US012667938B2

(12) United States Patent
Hyma et al.

(10) Patent No.: US 12,667,938 B2
(45) **Date of Patent: *Jun. 30, 2026**

(54) LOCKING PLIERS WITH IMPROVED ADJUSTMENT MEMBER

(71) Applicant: Milwaukee Electric Tool Corporation, Brookfield, WI (US)

(72) Inventors: Steven W. Hyma, Milwaukee, WI (US); Cheng Zhang Li, Sussex, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/980,309

(22) Filed: Dec. 13, 2024

(65) Prior Publication Data

US 2025/0108488 A1 Apr. 3, 2025

Related U.S. Application Data

(63) Continuation of application No. 18/357,750, filed on Jul. 24, 2023, now Pat. No. 12,202,107, which is a continuation of application No. 17/480,992, filed on Sep. 21, 2021, now Pat. No. 11,745,313, which is a continuation of application No. 16/261,323, filed on Jan. 29, 2019, now Pat. No. 11,154,965, which is a continuation of application No. 15/378,546, filed on Dec. 14, 2016, now Pat. No. 10,207,394, which is a (Continued)

(51) Int. Cl.
*B25B 7/12* (2006.01)

(52) U.S. Cl.
CPC .................................... *B25B 7/123* (2013.01)

(58) Field of Classification Search
CPC .............. B25B 7/123; B25B 7/12; B25B 7/14
USPC ............................................................ 81/378
See application file for complete search history.

(56) References Cited

U.S. PATENT DOCUMENTS 1,156,764 A 10/1915 Druck
1,489,458 A * 4/1924 Petersen ................ B25B 7/123 81/380

(Continued)

FOREIGN PATENT DOCUMENTS

EP 0216717 4/1987
EP 1237681 9/2002

(Continued)

OTHER PUBLICATIONS

Photographs of pliers taken on Sep. 19, 2012 (3 pages).

*Primary Examiner* — Hadi Shakeri
(74) *Attorney, Agent, or Firm* — Reinhart Boerner Van Deuren s.c.

(57) ABSTRACT

A hand tool includes a first jaw, a first handle fixed to the first jaw, a second jaw, and a second handle pivotally coupled to the second jaw, a link member, and an adjustment member. The adjustment member is operable to axially move a first end of the link member to vary a distance between the first and second jaws. The adjustment member includes an engagement surface engageable with the first end of the link member, a shank in threaded engagement with a bore in the first handle, and a flange extending from the shank opposite the engagement portion. The flange includes a first side, a second side opposite the first side, and an elongate opening extending through the first and second sides.

20 Claims, 4 Drawing Sheets

Related U.S. Application Data continuation of application No. 14/597,828, filed on Jan. 15, 2015, now abandoned.

(56) References Cited

U.S. PATENT DOCUMENTS

| | | | |
|---|---|---|---|
| 2,156,529 | A | 5/1939 | Dat |
| 2,280,005 | A | 4/1942 | Petersen |
| 2,388,580 | A | 11/1945 | Snell |
| 2,514,130 | A | 7/1950 | Jones |
| 2,519,630 | A | 8/1950 | Boyer |
| RE24,465 | E | 4/1958 | Waterbury |
| 2,854,877 | A | 10/1958 | Hunter |
| 2,857,795 | A | 10/1958 | Workman |
| 3,698,419 | A | 10/1972 | Tura |
| 3,710,658 | A | 1/1973 | Wilson |
| 3,859,874 | A | 1/1975 | Joeckel |
| 3,894,451 | A | 7/1975 | Putsch |
| D260,476 | S | 9/1981 | Knaus |
| 4,307,635 | A | 12/1981 | Genova |
| 4,519,278 | A | 5/1985 | Heldt |
| 4,850,254 | A | 7/1989 | Burney |
| 4,878,406 | A | 11/1989 | Simpson et al. |
| 4,926,722 | A | 5/1990 | Sorensen et al. |
| 5,005,449 | A | 4/1991 | Sorensen et al. |
| 5,009,134 | A | 4/1991 | Sorensen et al. |
| D320,919 | S | 10/1991 | Sorensen |
| 5,056,385 | A | 10/1991 | Petersen |
| 5,113,727 | A | 5/1992 | Foster |
| D328,846 | S | 8/1992 | Sorensen et al. |
| D331,180 | S | 11/1992 | Sorensen |
| D333,602 | S | 3/1993 | Gatzemeyer et al. |
| 5,197,359 | A | 3/1993 | Mills |
| D342,877 | S | 1/1994 | Adamic |
| 5,347,670 | A | 9/1994 | Duguette et al. |
| 5,351,585 | A | 10/1994 | Leseberg et al. |
| D357,165 | S | 4/1995 | Sorensen et al. |
| 5,456,144 | A | 10/1995 | Dahl et al. |
| 5,460,065 | A | 10/1995 | Balmer |
| D366,818 | S | 2/1996 | McGarry |
| 5,609,080 | A | 3/1997 | Flavigny |
| 5,640,876 | A | 6/1997 | Erwin |
| 5,775,680 | A | 7/1998 | Sorensen et al. |
| D398,208 | S | 9/1998 | Anderson |
| 5,813,297 | A | 9/1998 | Zepkowski |
| D399,398 | S | 10/1998 | Neyton |
| 5,988,616 | A | 11/1999 | Fuller et al. |
| 6,019,352 | A | 2/2000 | Mayer |
| D426,440 | S | 6/2000 | Torres |
| 6,175,998 | B1 | 1/2001 | Leo |
| 6,212,979 | B1 | 4/2001 | Wang |
| 6,227,080 | B1 | 5/2001 | Grayo et al. |
| 6,270,134 | B1 | 8/2001 | Lin |
| 6,279,433 | B1 | 8/2001 | Chervenak |
| 6,282,996 | B1 | 9/2001 | Berg et al. |
| 6,302,386 | B1 | 10/2001 | Fuller et al. |
| 6,311,588 | B1 | 11/2001 | St. John et al. |
| 6,341,545 | B1 | 1/2002 | Gomas |
| 6,347,791 | B1 | 2/2002 | Chervenak |
| 6,367,787 | B1 | 4/2002 | Poole et al. |
| 6,378,404 | B1 | 4/2002 | Bally et al. |
| 6,412,767 | B1 | 7/2002 | Beckmann et al. |
| D462,247 | S | 9/2002 | Hackman |
| 6,450,070 | B1 | 9/2002 | Winkler et al. |
| D472,438 | S | 4/2003 | Peperkorn et al. |
| 6,591,719 | B1 | 7/2003 | Poole et al. |
| 6,601,838 | B1 | 8/2003 | Gilley |
| 6,626,070 | B2 | 9/2003 | Peperkorn et al. |
| 6,776,072 | B2 | 8/2004 | Poole et al. |
| 6,857,342 | B2 | 2/2005 | Wang |
| 6,941,844 | B2 | 9/2005 | Hile |
| 6,966,243 | B1 | 11/2005 | Liao |
| 6,993,999 | B2 | 2/2006 | Wong |
| 7,086,312 | B1 | 8/2006 | Tortolani |
| 7,104,166 | B1 | 9/2006 | Wong |
| 7,134,365 | B2 | 11/2006 | Hile |
| 7,146,887 | B2 | 12/2006 | Hunter |
| D535,172 | S | 1/2007 | Engvall et al. |
| D535,173 | S | 1/2007 | Engvall et al. |
| D535,542 | S | 1/2007 | Engvall et al. |
| 7,249,542 | B2 | 7/2007 | McNatt |
| 7,363,669 | B2 | 4/2008 | Berg et al. |
| D571,631 | S | 6/2008 | Gandy, III |
| 7,389,714 | B1 | 6/2008 | Heagerty |
| 7,434,498 | B2 | 10/2008 | Johnson |
| 7,454,999 | B2 | 11/2008 | Wu |
| 7,472,632 | B2 | 1/2009 | Engvall et al. |
| 7,509,895 | B2 | 3/2009 | Engvall et al. |
| D599,637 | S | 9/2009 | Valencia |
| D605,917 | S | 12/2009 | Sands |
| 7,637,753 | B2 | 12/2009 | Wong et al. |
| 7,641,183 | B2 | 1/2010 | Fuller et al. |
| 7,651,078 | B2 | 1/2010 | Geier et al. |
| 7,669,505 | B2 | 3/2010 | Campbell et al. |
| 7,699,297 | B2 | 4/2010 | Cicenas et al. |
| 7,721,630 | B2 | 5/2010 | Hunter |
| 7,726,217 | B2 | 6/2010 | Engvall et al. |
| 7,730,810 | B1 | 6/2010 | Janson |
| 7,735,813 | B2 | 6/2010 | Geier et al. |
| 7,815,175 | B2 | 10/2010 | Cicenas et al. |
| 7,861,622 | B2 | 1/2011 | Chervenak et al. |
| 7,896,322 | B2 | 3/2011 | Geler et al. |
| D635,427 | S | 4/2011 | Chervenak et al. |
| D635,428 | S | 4/2011 | Lucus |
| 7,942,392 | B2 | 5/2011 | Geier et al. |
| 7,954,794 | B2 | 6/2011 | Fuller et al. |
| 7,984,895 | B2 | 7/2011 | Strauss et al. |
| 8,024,998 | B1 | 9/2011 | Valencia |
| 8,056,451 | B2 | 11/2011 | Chervenak et al. |
| D651,060 | S | 12/2011 | Chervenak et al. |
| 8,074,340 | B2 | 12/2011 | Cicenas et al. |
| D653,092 | S | 1/2012 | Carra |
| 8,122,792 | B2 | 2/2012 | Engvall et al. |
| 8,176,814 | B1 | 5/2012 | Bernstein et al. |
| 8,225,700 | B2 | 7/2012 | Hile |
| 8,240,647 | B2 | 8/2012 | Geier et al. |
| 8,266,990 | B1 | 9/2012 | Janson |
| 8,270,134 | B2 | 9/2012 | Rogoll et al. |
| 8,302,512 | B2 | 11/2012 | Shih |
| 8,429,948 | B1 | 4/2013 | Warren |
| D682,067 | S | 5/2013 | Tillet |
| 8,479,618 | B2 | 7/2013 | Hsiao |
| D718,107 | S | 11/2014 | Bascom |
| D724,926 | S | 3/2015 | Hernandez, Jr. et al. |
| D771,456 | S | 11/2016 | Hyma |
| 9,492,911 | B2 | 11/2016 | Hyma et al. |
| 2002/0157507 | A1 | 10/2002 | Chou |
| 2003/0196526 | A1 | 10/2003 | Wang |
| 2007/0131068 | A1 | 6/2007 | McNatt |
| 2007/0180957 | A1 | 8/2007 | Johnson |
| 2008/0173143 | A1 | 7/2008 | Wu |
| 2008/0216615 | A1 | 9/2008 | Wu |
| 2010/0018362 | A1 | 1/2010 | Chervenak et al. |
| 2010/0084798 | A1 | 4/2010 | Geier et al. |
| 2010/0218648 | A1 | 9/2010 | Chervenak et al. |
| 2011/0067184 | A1 | 3/2011 | Robert |
| 2011/0113935 | A1 | 5/2011 | Hall |
| 2011/0203421 | A1 | 8/2011 | Chervenak et al. |
| 2012/0096998 | A1 | 4/2012 | Shih |
| 2013/0014618 | A1 | 1/2013 | Wu |
| 2013/0047794 | A1 | 2/2013 | Huang |
| 2013/0192429 | A1 | 8/2013 | Cripps |
| 2013/0228046 | A1 | 9/2013 | Wu |
| 2016/0207175 | A1 | 7/2016 | Hyma et al. |
| 2017/0087695 | A1 | 3/2017 | Hyma et al. |
| 2019/0076994 | A1 * | 3/2019 | Blumenthal .............. B25B 7/02 |
| 2020/0094382 | A1 | 3/2020 | Blumenthal et al. |

FOREIGN PATENT DOCUMENTS

| | | |
|---|---|---|
| TW | M316129 | 8/2007 |
| TW | M387738 | 9/2010 |
| TW | D145453 | 2/2012 |
| WO | WO 9518699 | 7/1995 |

(56) References Cited

FOREIGN PATENT DOCUMENTS

* cited by examiner

LOCKING PLIERS WITH IMPROVED ADJUSTMENT MEMBER

CROSS-REFERENCE TO RELATED APPLICATIONS

This application is a continuation of U.S. patent application Ser. No. 18/357,750, filed Jul. 24, 2024, which is a continuation of U.S. patent application Ser. No. 17/480,992, now U.S. Pat. No. 11,745,313, filed Sep. 21, 2021, which is a continuation of U.S. patent application Ser. No. 16/261,323, now U.S. Pat. No. 11,154,965, filed Jan. 29, 2019, which is a continuation of U.S. patent application Ser. No. 15/378,546, now U.S. Pat. No. 10,207,394, filed Dec. 14, 2016, which is a continuation of U.S. patent application Ser. No. 14/597,828, filed Jan. 15, 2015, the entire contents of all are hereby incorporated by reference herein.

FIELD OF THE INVENTION

The present invention relates to locking pliers and, more particularly, to a locking pliers having an improved adjustment member.

BACKGROUND

Locking pliers typically include a fixed jaw, a movable jaw, and an over-center linkage operable to lock the movable jaw in an adjustable position with respect to the fixed jaw.

SUMMARY

The invention provides, in one aspect, a hand tool including a first assembly including a first jaw and a first handle fixed to the first jaw, the first handle having a bore at an end opposite the first jaw, a second assembly pivotally coupled to the first assembly, the second assembly including a second jaw and a second handle pivotally coupled to the second jaw, a link member having a first end axially movable along the first assembly and a second end pivotally coupled to the second assembly, and an adjustment member operable to axially move the first end of the link member along the first assembly to vary a distance between the first and second jaws. The adjustment member includes an engagement surface engageable with the first end of the link member, a shank in threaded engagement with the bore, the shank defining a longitudinal axis, and a flange extending from the shank opposite the engagement portion. The flange includes a substantially planar first side, a substantially planar second side opposite the first side, and an elongate opening extending through the first and second sides. The elongate opening defines a first diameter coaxial with the longitudinal axis and a second diameter perpendicular to the longitudinal axis. The first diameter is greater than the second diameter.

The present invention provides, in another aspect, a method of clamping a workpiece between first and second jaws of a hand tool, the hand tool having a first assembly including the first jaw and a first handle fixed to the first jaw, a second assembly pivotally coupled to the first assembly and including the second jaw and a second handle pivotally coupled to the second jaw, a link member having a first end axially movable along the first assembly and a second end pivotally coupled to the second assembly, and an adjustment member having a threaded shank defining a longitudinal axis and a flange. The method includes pivoting the second handle towards the first handle to move the second jaw toward the workpiece, inserting a shank of a screwdriver through an elongate opening in a flange of the adjustment member, and applying force to the screwdriver to rotate the adjustment member, thereby axially moving the first end of the link member along the first assembly to move the second jaw further toward the workpiece and to increase a clamping force applied to the workpiece by the first and second jaws.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
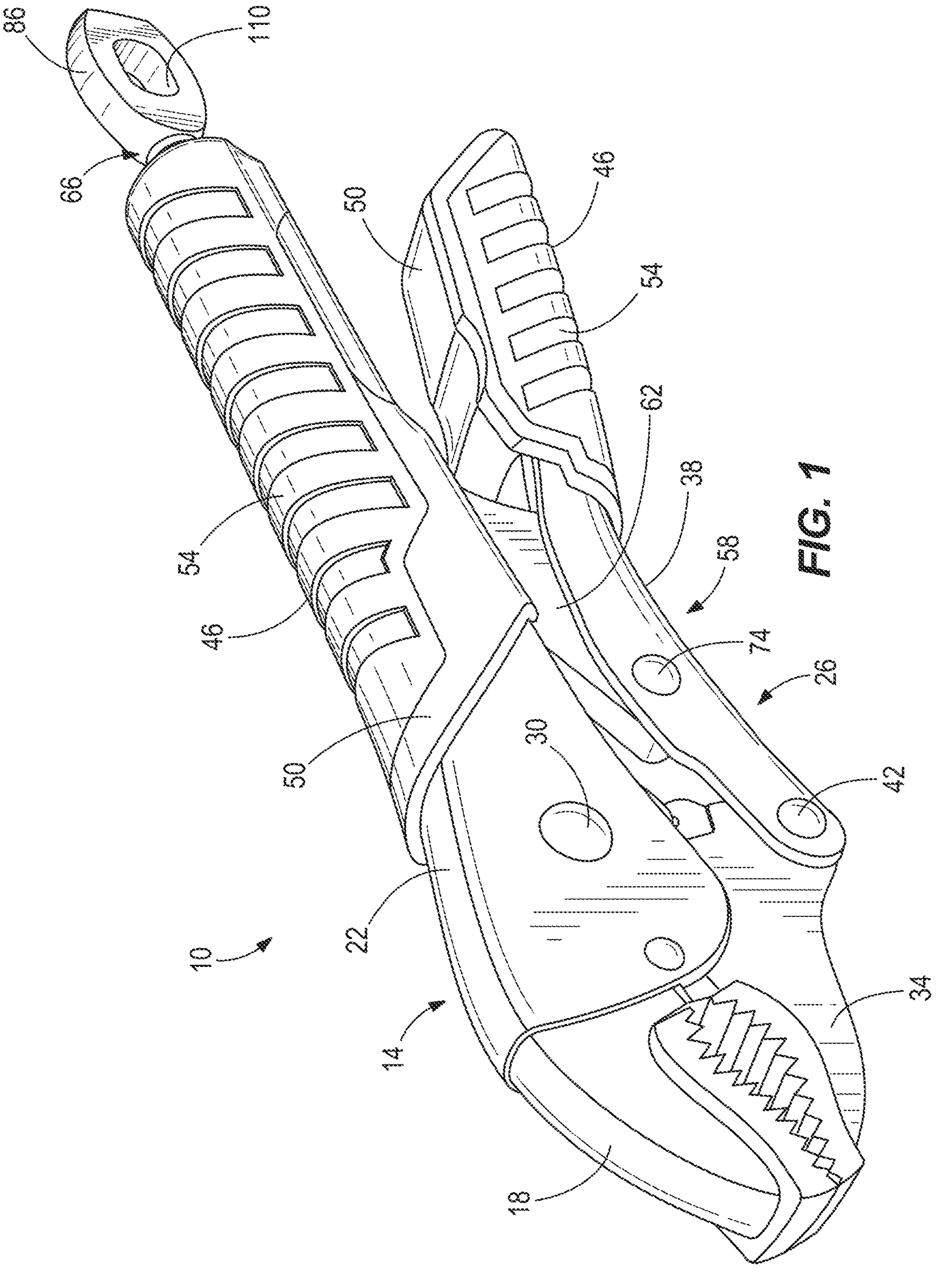
FIG. 1 is a perspective view of a locking pliers according to an embodiment of the invention.

FIG. 1 illustrates a hand tool in the form of a locking pliers 10. The pliers 10 includes a first assembly 14, which includes a first jaw 18 and a first handle 22 fixed to the first jaw 18. A second assembly 26 is pivotally coupled to the first assembly 14 at a first pivot point 30. The second assembly 26 includes a second jaw 34 and a second handle 38 pivotally coupled to the second jaw 34 at a second pivot point 42. As such, the handles 22, 38 are connected by a compound type pivot joint, and the handles 22, 38 pivot about the points 30, 42 to move the jaws 18, 34 between open and closed positions (i.e. to increase or decrease a distance between the jaws 18, 34). The illustrated jaws 18, 34 are curved pliers jaws; however, in other embodiments, the jaws 18, 34 may be C-shaped clamping arms or any type of jaws. The jaws 18, 34 are made of chrome plated, forged alloy steel for high durability and corrosion resistance. In other embodiments, the jaws 18, 34 can be made of other materials.

Figure 2:
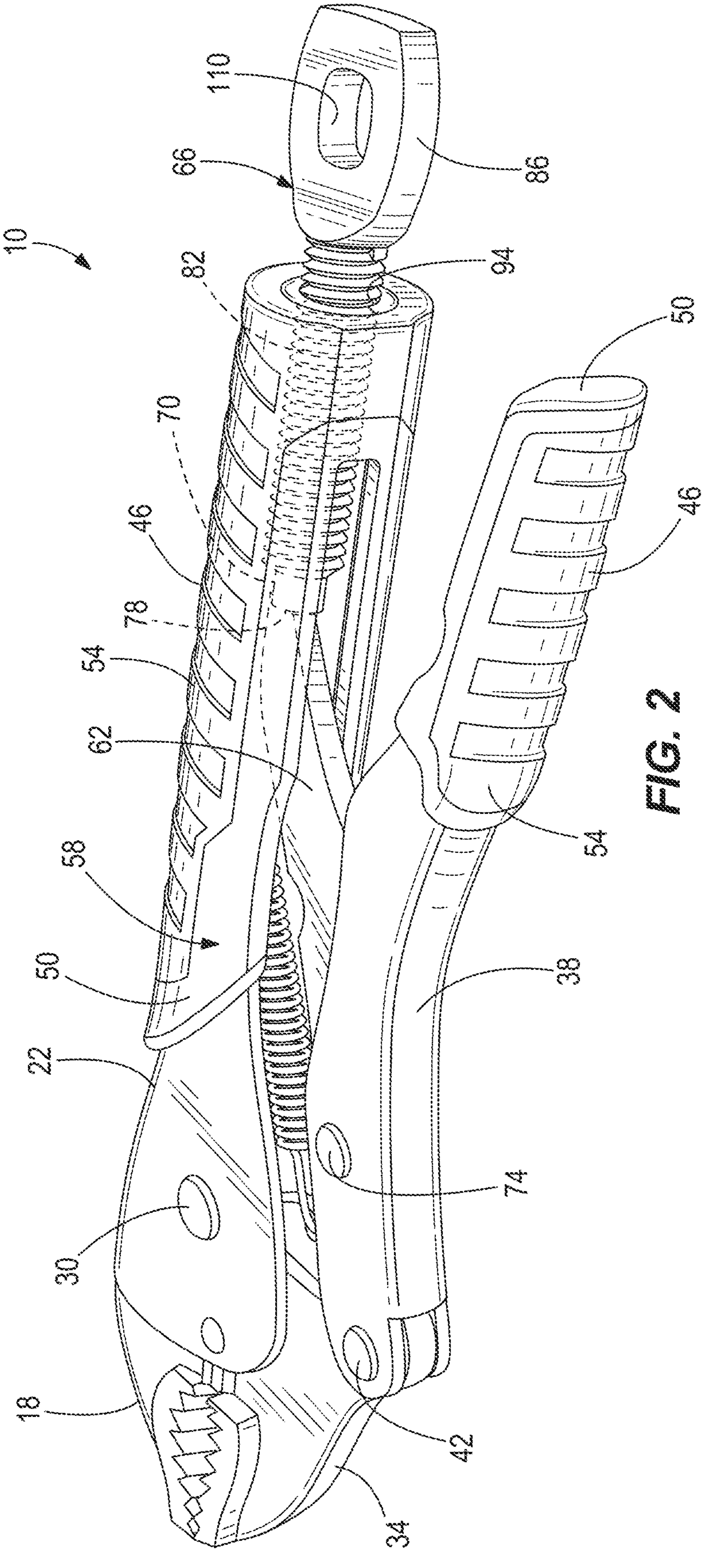
FIG. 2 is another perspective view of the locking pliers of FIG. 1.

With reference to FIGS. 1 and 2, the illustrated pliers 10 further includes grips 46 overmolded on the handles 22, 38 for improved user comfort. The grips 46 include a first, relatively hard, rigid material 50 and a second, relatively soft, pliable material 54. In other embodiments, the grips 46 can be made of a single material or can be omitted.

The pliers 10 includes a locking mechanism 58 that is operable to retain the pliers 10 in the closed position. The locking mechanism 58 includes a link member 62 and an adjustment member or control key 66. A first end 70 of the link member 62 is axially movable along the first assembly 14 and a second end of the link member 62 is pivotally coupled to the second assembly 26 at a third pivot point 74 (FIG. 2). In some embodiments, a release lever may be provided to release the pliers 10 from the locked closed position and allows the pliers 10 to move the open position.

Figure 3:
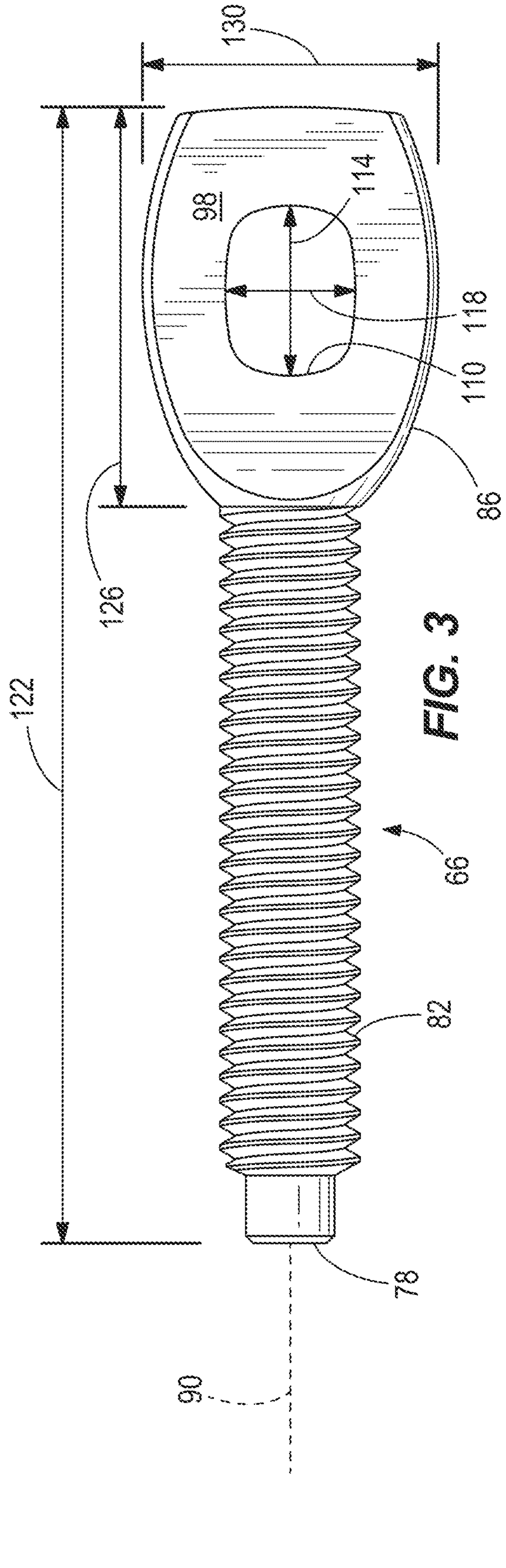
FIG. 3 is a side view of an adjustment member of the locking pliers of FIG. 1.

Referring to FIGS. 2 and 3, the adjustment member 66 includes an engagement surface 78 at one end, a threaded shank 82, and a flange 86 extending from the shank 82 opposite the engagement surface 78 (FIG. 3). The adjustment member 66 is integrally formed as a single component from metal such as by casting, forging, and the like. The threaded shank 82 defines a longitudinal axis 90 and is received by a threaded bore 94 in an end of the first handle 22 opposite the first jaw 18. The adjustment member 66 is rotatable relative to the first handle 22 to translate the adjustment member 66 in the axial direction (FIG. 2). Engagement between the engagement surface 78 and the first end 70 of the link member 62 causes the link member 62 to pivot about the third pivot point 74, adjusting the force the jaws 18, 37 exert on a workpiece when the pliers 10 is in the closed position.

Figure 4:
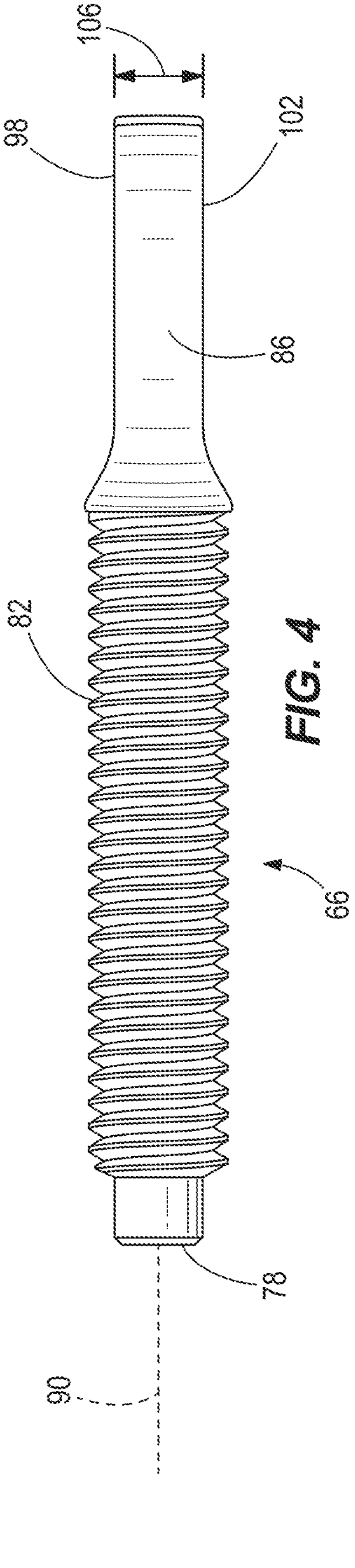
FIG. 4 is a top view of the adjustment member of FIG. 3.

With reference to FIGS. 3 and 4, the adjustment member 66 is sized and shaped to provide high strength and to facilitate user manipulation. The flange 86 is substantially flat, including a substantially planar first side 98 and a substantially planar second side 102 opposite the first side. The flange 86 defines a thickness 106 measured between the first and second sides 98, 102. In some embodiments, the thickness 106 is between about 4 millimeters and about 9 millimeters. Because the flange 86 is flat and relatively thick, it can be easily grasped between a user's fingers and turned by hand, even when the jaws 18, 34 are already locked on to a workpiece. In contrast, conventional knurled adjustment knobs are difficult to grip and turn when any appreciable resistance is encountered. The flat shape also allows the flange 86 to be securely gripped by a pliers, box wrench, and the like to assist the user with rotating the adjustment member 66 relative to the handle 22 to adjust the clamping force.

The adjustment member 66 further includes an elongate opening 110 that extends through the sides 98, 102. The opening 110 defines a first or major diameter 114 coaxial with the longitudinal axis 90, such that the opening 110 is centered with respect to the longitudinal axis 90. The opening 110 defines a second or minor diameter 118 perpendicular to the longitudinal axis 90. The minor diameter 118 is less than the major diameter 114, giving the opening 110 its elongate shape. In some embodiments, the minor diameter 118 is between about 6 millimeters and about 12 millimeters, and the major diameter 114 is between about 8 millimeters and about 16 millimeters. In some embodiments, a ratio of the minor diameter 118 to the major diameter 114 is between about 0.4 and about 0.9. The elongate opening 110 is sized to receive an elongated member 300, such as a shank of a screwdriver (FIG. 5), to assist the user with rotating the adjustment member 66 relative to the handle 22 to adjust the clamping force. The elongated shape allows the screwdriver or other elongated member 300 to be positioned accurately in an optimal position to evenly apply torque. The opening 110 can also be used to hang the pliers 10 when not in use.

The relative dimensions of the adjustment member 66 contribute to its strength, durability, and manufacturability. With reference again to FIGS. 3 and 4, the adjustment member 66 defines an overall length 122 measured from the engagement surface 78 to an end of the flange 86 opposite the engagement surface 78. In some embodiments, the overall length 122 is between about 50 millimeters and about 100 millimeters. The flange 86 also defines a flange length 126, measured from the end of the flange 86 to the shank 82, and a flange width 130 measured perpendicular to the thickness 106 and the flange length 126. In some embodiments, the flange length 126 is between about 19 millimeters and about 35 millimeters. In some embodiments, the flange width 130 is between about 14 millimeters and about 27 millimeters. In some embodiments, a ratio of the flange length 126 to the overall length 122 is between about 0.2 and about 0.7. In some embodiments, a ratio of the flange width 130 to the flange length 126 is between about 0.4 and about 1.4. In some embodiments, a ratio of the major diameter 114 to the flange length 126 is between about 0.2 and about 0.8. In some embodiments, a ratio of the minor diameter 118 to the flange width 130 is between about 0.2 and about 0.8.

Figure 5:
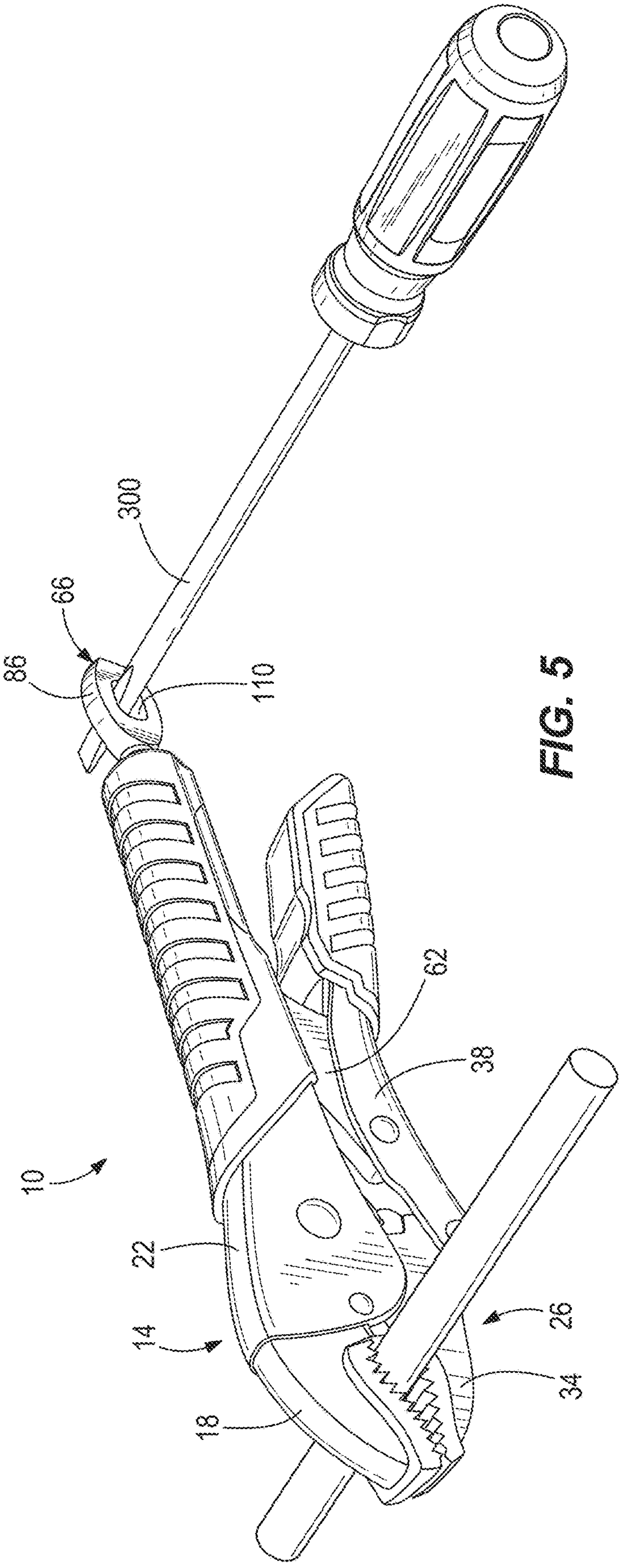
FIG. 5 is a perspective view of the locking pliers of FIG. 1 in use.

In operation, the user positions the jaws 18, 34 around a workpiece in the open position, then pivots the second handle 38 towards the first handle 22 to move the second jaw 34 toward the closed position. The user may then grasp the flange 86 and rotate the adjustment member 66 relative to the first handle 22 to decrease the distance between the jaws 18, 34 and thereby increase the clamping force when the jaws 18, 34 contact the workpiece. Where a high clamping force is desired, the user can insert an elongated member 300 through the elongate opening 110 to assist in rotating the adjustment member 66 while the jaws 18, 34 remain clamped on the workpiece (FIG. 5).

When using a typical locking pliers (not shown), a user must often guess at the correct adjustment setting when the jaws are open, then attempt to close the jaws on a workpiece. This process is repeated until the user determines the proper setting for the desired clamping force. With the improved adjustment member 66 of the illustrated pliers 10, the user can quickly and efficiently increase the clamping force exerted by the jaws 18, 34 on the workpiece while the jaws 18, 34 remain closed on the workpiece.

Various features of the invention are set forth in the following claims.

What is claimed is:

1. A hand tool comprising:

a first assembly including a first jaw and a first handle fixed to the first jaw, the first handle having a bore at an end opposite the first jaw;

a second assembly pivotally coupled to the first assembly, the second assembly including a second jaw and a second handle pivotally coupled to the second jaw;

a link member having a first end axially movable along the first assembly and a second end pivotally coupled to the second assembly; and an adjustment member operable to axially move the first end of the link member along the first assembly to vary a distance between the first and second jaws, the adjustment member including:

- an engagement surface engageable with the first end of the link member;
- a shank in threaded engagement with the bore, the shank defining a longitudinal axis; and
- a flange extending from the shank opposite the engagement surface, the flange including:
  - a first side;
  - a second side opposite the first side; and
  - an elongate opening extending through the first and second sides;

wherein the elongate opening defines a major dimension coaxial with the longitudinal axis and a minor dimension perpendicular to the longitudinal axis;

wherein the major dimension is greater than the minor dimension;

wherein the minor dimension is between 6 millimeters and 12 millimeters;

wherein the major dimension is between 8 millimeters and 16 millimeters; and wherein a ratio of the minor dimension to the major dimension is between 0.4 and 0.9.

2. The hand tool of claim 1, wherein the flange defines a thickness measured between the first and second sides, wherein the flange defines a flange length measured from the end of the flange to the shank; and wherein the flange defines a flange width measured perpendicular to the thickness and the flange length.

3. The hand tool of claim 2, wherein a ratio of the major dimension to the flange length is between 0.2 and 0.8.

4. The hand tool of claim 2, wherein a ratio of the flange width to the flange length is between 0.4 and 1.4.

5. The hand tool of claim 2, wherein the flange length is between 19 millimeters and 35 millimeters.

6. The hand tool of claim 1, wherein the adjustment member defines an overall length measured from the engagement surface to an end of the flange opposite the engagement surface; and wherein the overall length is between 50 millimeters and 100 millimeters.

7. The hand tool of claim 1, wherein the first jaw and the second jaw are made of steel.

8. The hand tool of claim 1, wherein the first side includes a first substantially planar portion and the second side includes a second substantially planar portion.

9. A hand tool comprising:

a first assembly including a first jaw and a first handle fixed to the first jaw, the first handle having a bore at an end opposite the first jaw;

a second assembly pivotally coupled to the first assembly, the second assembly including a second jaw and a second handle pivotally coupled to the second jaw;

a link member having a first end axially movable along the first assembly and a second end pivotally coupled to the second assembly; and an adjustment member operable to axially move the first end of the link member along the first assembly to vary a distance between the first and second jaws, the adjustment member including:

an engagement surface engageable with the first end of the link member;

a shank in threaded engagement with the bore, the shank defining a longitudinal axis; and a flange adjacent to and extending from the shank opposite the engagement surface, the flange including:

a first side;

a second side opposite the first side; and an elongate opening extending through the first and second sides;

wherein the elongate opening defines a major dimension coaxial with the longitudinal axis and a minor dimension perpendicular to the longitudinal axis;

wherein the major dimension is greater than the minor dimension;

wherein the flange defines a thickness measured between the first and second sides;

wherein the adjustment member defines an overall length measured from the engagement surface to an end of the flange opposite the engagement surface;

wherein the flange defines a flange length measured from the end of the flange to the shank, and wherein the flange defines a flange width measured perpendicular to the thickness and the flange length;

wherein the flange length is between 19 millimeters and 35 millimeters;

wherein the flange width is between 14 millimeters and 27 millimeters; and wherein a ratio of the flange length to the overall length is between 0.2 and 0.7.

10. The hand tool of claim 9, wherein a ratio of the flange width to the flange length is between 0.4 and 1.4.

11. The hand tool of claim 9, wherein the elongate opening is sized to receive a screwdriver shank therethrough, wherein the first jaw and the second jaw are made of chrome plated forged alloy steel.

12. The hand tool of claim 9, wherein the minor dimension is between 6 millimeters and 12 millimeters.

13. The hand tool of claim 9, further comprising a first grip overmolded on the first handle and a second grip overmolded on the second handle.

14. The hand tool of claim 9, wherein the major dimension is a major diameter and the minor dimension is a minor diameter.

15. A hand tool comprising:

a first assembly including a first jaw and a first handle fixed to the first jaw, the first handle having a bore at an end opposite the first jaw;

a second assembly pivotally coupled to the first assembly, the second assembly including a second jaw and a second handle pivotally coupled to the second jaw;

a link member having a first end axially movable along the first assembly and a second end pivotally coupled to the second assembly; and an adjustment member operable to axially move the first end of the link member along the first assembly to vary a distance between the first and second jaws, the adjustment member including:

an engagement surface engageable with the first end of the link member;

a shank in threaded engagement with the bore, the shank defining a longitudinal axis; and a flange adjacent to and extending from the shank opposite the engagement surface, the flange including:

a first side;

a second side opposite the first side; and an elongate opening extending through the first and second sides, wherein the elongate opening defines a major dimension coaxial with the longitudinal axis and a minor dimension perpendicular to the longitudinal axis;

wherein the major dimension is greater than the minor dimension;

wherein the flange defines a thickness measured between the first and second sides;

wherein the flange defines a flange length measured from the end of the flange to the shank, and wherein the flange defines a flange width measured perpendicular to the thickness and the flange length;

wherein a ratio of the flange width to the flange length is between 0.4 and 1.4;

wherein a ratio of the major dimension to the flange length is between 0.2 and 0.8; and wherein a ratio of the minor dimension to the flange width is between 0.2 and 0.8.

16. The hand tool of claim 15, wherein the adjustment member defines an overall length measured from the engagement surface to an end of the flange opposite the engagement surface and wherein the overall length is between 50 millimeters and 100 millimeters.

17. The hand tool of claim 16, wherein a ratio of the flange length to the overall length is between 0.2 and 0.7.

18. The hand tool of claim 15, wherein the flange length is between 19 millimeters and 35 millimeters.

19. The hand tool of claim 15, wherein the flange width is between 14 millimeters and 27 millimeters.

20. The hand tool of claim 15, wherein the flange is integrally formed with the shank.

* * * * *